UNITED STATES PATENT OFFICE.

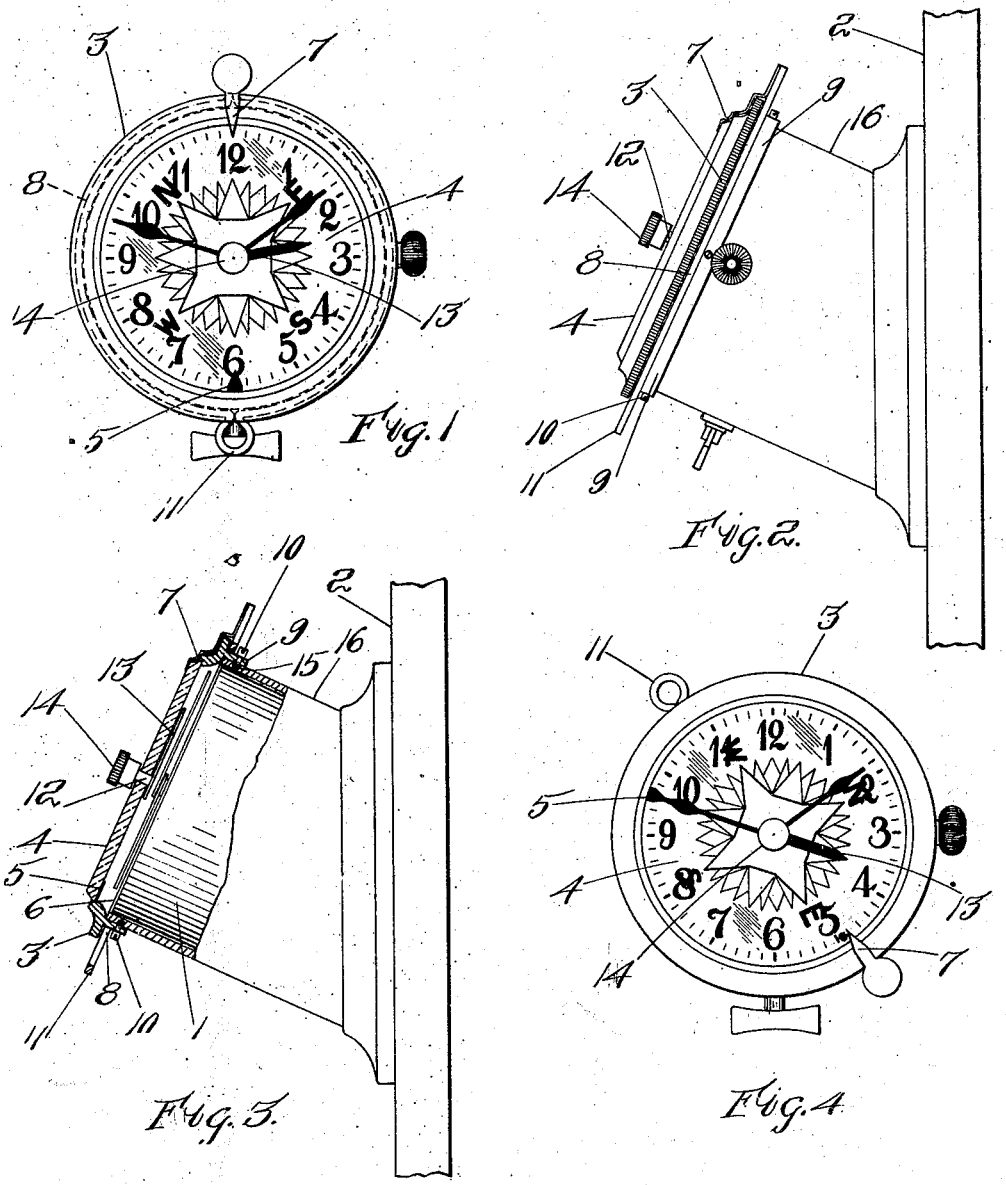

THOMAS CUNNINGHAM, OF WENHAM, MASSACHUSETTS.

NAUTICAL-CLOCK REGISTER.

No. 931,278.

Specification of Letters Patent.

Patented Aug. 17, 1909.

Application filed April 29, 1909. Serial No. 492,905.

*To all whom it may concern:*

Be it known that I, THOMAS CUNNINGHAM, a citizen of the United States, residing at Wenham, in the county of Essex and State of Massachusetts, have invented a certain new and useful Improvement in Nautical-Clock Registers, of which the following is a specification, reference being had therein to the accompanying drawings.

A sea-chart shows the distance between certain objects, lights, buoys or other points, and also the course which the vessel is supposed to run in going from one of those points to the next. In case of a steam-propelled vessel, the speed of the vessel is known approximately and the length of time that it will take to run the course from one of the points indicated on the chart to the next point can be very closely calculated, taking into consideration the normal speed of the vessel and making due allowance for winds, currents and other elements which may tend to affect the speed.

When running in the dark or in a dense fog, or when for any reason the marks or points or beacons cannot be seen or the bell of a buoy or the fog horn cannot be heard, it is important to calculate by other means very accurately when the course of the vessel should be changed.

Heretofore it has been the practice for the man at the wheel to jot down on a piece of paper or in a book the time of departure from a certain point, calculate the length of time that should be consumed to make the run to the next point, jot that down on the paper, and also the hour and minute when the said time will expire, and the man at the wheel must either constantly carry that hour and minute in his mind, or else must frequently refresh his memory from the memorandum on the paper. All this is inconvenient and especially so in wet and windy weather if he is exposed to the weather, as the paper or book is usually carried in the pocket and has to be frequently taken out and put back, and when he changes the course, he has to make a new calculation and jot the data down in his book, all perhaps while exposed to the wet.

The object of this invention is to provide a device in combination with a clock to show the time of departure from any certain object, light, beacon or buoy, as indicated on the chart, the time consumed between the time of departure and the time of arrival at the next destination, and also the course which the vessel is supposed to run between those two points.

The invention will be fully understood from the following description taken in connection with the accompanying drawings, and the novel features are pointed out and clearly defined in the claims at the close of the specification.

In the drawings,—Figure 1 is a true plan of the face of a clock having combined therewith apparatus embodying my invention. Fig. 2 is a side elevation of a clock equipped with my device. Fig. 3 is a side elevation, partly in section. Fig. 4 is a true plan of the face showing the various indicators set to a different position from that shown in Fig. 1 to show a new time of departure and time of arrival and course of the vessel.

Referring to the drawings,—1 represents a clock to which the apparatus embodying the invention is attached and which may be attached to a wall, table or other support 2 in plain view of the man at the wheel and readily accessible. The bezel 3 of the clock which holds the crystal 4 is so constructed and connected with the case of the clock that it may be easily rotated by hand.

An index hand or pointer 5 is formed on or attached to the face of the crystal, preferably in the inner face and at the outer edge or to the inner edge of the bezel, so that it moves with the bezel and crystal when the latter is rotated. The index 5 points radially inward. By rotating the bezel and crystal the index 5 may be made to stop over any one of the minute marks on the dial 6 of the clock.

Suitably secured to the case or to the bezel of the clock so as to be moved independently of the movement of the bezel and crystal is another pointer 7 pointing radially inward which also may be set over any minute mark on the dial. In the form of construction shown the indicator 7 is mounted upon a ring 8 which loosely encircles the flange 9 of the bezel so that the ring 8 can be turned to set the pointer. The ring 8 is held from falling by the guard pins 10 projecting from the said flange 9 which enter an annular groove 15 in the case 16 and also retain the bezel 3 in connection with the case. A finger-piece 11 furnishes a convenient means for turning the ring 8 for the purpose of setting the pointer.

Marked upon the crystal 4 or upon a disk attached thereto are the points of the compass. The preferred manner of marking the points of the compass is by engraving them on the crystal in such manner that they can be readily seen without obscuring the view through the crystal of the minute and hour hands of the clock and the view of the dial. The precise method of indicating the points of the compass, however, is not essential. As shown in the drawings, the principal points of the compass, north, east, south and west, are marked with the heaviest lines; the intermediate points, northeast, southeast, northwest and southwest, by somewhat lighter lines; and the other intermediate points correspondingly graded.

Passing centrally outward through the crystal is a rotatable stud 12 which carries fixed thereon a radially extending pointer 13. On the under side of the crystal and secured to said stud on the outer side of the crystal is a thumb-nut 14, whereby the stud may be rotated and thereby set the pointer 13 to any point of the compass. The inner end of the stud is journaled in suitable bearing.

It is obvious that instead of having the bezel and the crystal rotatable and the departure time indicator 5 fixed to the crystal, the bezel and crystal may be fixed, and the indicator 5 may be made movable, for instance in a similar manner as the arrival time indicator 7 is made movable, or any other suitable means of holding it in its adjusted position and allowing it to be moved may be employed, but there should be some distinction between the appearance of the departure and arrival indicators so that the navigator can readily distinguish which is the departure and which is the arrival indicator.

The method of using the apparatus is as follows: Immediately upon starting on any new course, the apparatus is set to indicate the time of departure, the time when it should arrive at the next point, and the course. Suppose the time at which the vessel departs from a certain point indicated on the chart is twelve minutes of two and suppose the chart shows that the distance to the next point of destination of the vessel is six miles, and suppose the vessel is running at the rate of 10 knots an hour after making due allowance for winds and currents: that is, a knot in six minutes, so that it would, or ought to, take 36 minutes to run the course to the next point. That is, if the time of departure is twelve minutes of two, it should arrive at the end of that course at twenty-four minutes past two, and it would then be time to change the course of the vessel. Immediately upon starting on the course the departure pointer 5 should be set at twelve minutes before two and the arrival pointer 7 should be set to point at twenty-four minutes past the hour as shown in Fig. 4. Suppose the chart shows that the direction of the course is north-east: The pointer 13 is moved by means of the thumb-nut 14 to point to the northeast point of the compass as also shown in Fig. 4. The apparatus is now fully set so that the man at the wheel can tell by a single glance at the clock at any time the course on which the vessel is running, the exact time when the vessel left the last point and when the vessel is due at the next point where the course of the vessel should be changed. As he approaches that point, he will be on an especially sharp lookout for any signal that there may be, such as a light or buoy or bell. If the weather is so thick or foggy that the buoy or other mark is invisible, he will immediately change his course as called for by the chart as soon as the time has expired when he is due at the point where the change should be made. If the signal is a bell, and he does not hear the bell, he will use his judgment whether to run a short distance farther on the course before changing on the assumption that the vessel may have slowed up in its speed. When the course is changed, he will immediately reset the device to indicate the new course and time of departure and time of arrival at the next point.

I claim as my invention:

1. In combination with a clock, a crystal for said clock having marked thereon the points of the compass, a movable pointer adapted to be set at any one of the said marked points of the compass, hour and minute hands which move with the clock and two independently adjustable pointers which are adapted to be set to register respectively the time of departure from any particular point and the anticipated time of arrival at another point.

2. In combination with a clock, a rotatable crystal having a marker whereby the time of departure from a particular point may be registered, adjustable means for indicating at the time of departure the anticipated time of future arrival at the destination and adjustable means for registering the course on which the vessel should be run.

3. In combination with a clock, hour and minute hands, two independently adjustable pointers which may be set to register different points on the dial of the clock, means for setting the said pointers, a crystal for said clock having indicated thereon the points of the compass and a movable pointer adapted to be set at any one of the marked points of the compass.

4. In combination with a clock having a dial with minutes and hours marked thereon and hour and minute hands moved by the clock mechanism, a crystal face for said clock, a rotatable bezel which holds said crystal, a pointer at the outer periphery of said crystal pointing radially inward, whereby it may be made to point to any particular minute on the dial by rotating said bezel, a second pointer secured outside of said bezel and pointing radially inward and movable independently of said bezel adapted to be set to point to any particular minute on the dial of the clock, the crystal having formed thereon marks indicating the points of the compass, and a rotatable stud passing centrally through said crystal and having mounted thereon a pointer pointing radially outward and adapted to be set to any one of the compass points marked on said crystal and means for moving said pointers.

In testimony whereof I affix my signature, in presence of two witnesses.

THOMAS CUNNINGHAM.

Witnesses:
WILLIAM A. COPELAND,
ALICE H. MORRISON.